United States Patent [19]

Anderson

[11] Patent Number: 4,963,303

[45] Date of Patent: Oct. 16, 1990

[54] ULTRAFILTRATION POLYIMIDE MEMBRANE AND ITS USE FOR RECOVERY OF DEWAXING AID

[75] Inventor: Bryce P. Anderson, Carlsbad, Calif.

[73] Assignee: Exxon Research & Engineering Company, Florham Park, N.J.

[21] Appl. No.: 458,880

[22] Filed: Dec. 29, 1989

Related U.S. Application Data

[62] Division of Ser. No. 312,020, Feb. 16, 1985, Pat. No. 4,908,134.

[51] Int. Cl.$^5$ ............................................. B01D 13/00
[52] U.S. Cl. .............................. 264/41; 210/500.39; 264/216; 264/331.12; 521/64
[58] Field of Search ................... 264/41, 216, 331.12; 210/500.39; 521/61, 64

[56] References Cited

U.S. PATENT DOCUMENTS

| | | | |
|---|---|---|---|
| 3,708,458 | 1/1973 | Alberino et al. | 260/65 |
| 3,925,211 | 12/1975 | Schumann et al. | 210/500 M |
| 4,192,732 | 3/1980 | Onodera et al. | 208/33 |
| 4,240,914 | 12/1980 | Iwama et al. | 210/500.2 |
| 4,307,135 | 12/1981 | Fox | 427/244 |
| 4,358,378 | 11/1982 | Iwama et al. | 210/500.2 |
| 4,378,324 | 3/1983 | Makino et al. | 264/41 |
| 4,385,084 | 5/1983 | Iwama et al. | 427/244 |
| 4,528,004 | 7/1985 | Makino et al. | 55/158 |
| 4,532,041 | 7/1985 | Shuey et al. | 210/500.2 |
| 4,836,927 | 6/1989 | Wan | 210/651 |

FOREIGN PATENT DOCUMENTS

| | | |
|---|---|---|
| 036315 | 9/1981 | European Pat. Off. |
| 037730 | 10/1981 | European Pat. Off. |
| 146298 | 6/1985 | European Pat. Off. |
| 154746 | 9/1985 | European Pat. Off. |
| 2051664 | 1/1981 | United Kingdom |
| 2073654 | 10/1981 | United Kingdom |
| 2098994 | 12/1982 | United Kingdom |
| 2104411 | 3/1983 | United Kingdom |
| 2101137 | 1/1988 | United Kingdom |

OTHER PUBLICATIONS

"High-Temperature Ultrafiltration Membrane" Sarbolouki, JPL Invention Report 30-4918/NPO-15431, 1982.

"New Polyimide Ultrafiltration Membrane for Organic Use", Iwama et al., Journal of Membrane Science 11, (1982), 297-309.

*Primary Examiner*—Morton Foelak
*Attorney, Agent, or Firm*—Joseph J. Allocca

[57] ABSTRACT

Polyimide ultrafiltration membranes made using a single solvent and containing a pore forming agent have been produced and have been found to be useful for recovering dewaxing aid used in dewaxing process.

7 Claims, No Drawings

ULTRAFILTRATION POLYIMIDE MEMBRANE AND ITS USE FOR RECOVERY OF DEWAXING AID

BRIEF DESCRIPTION OF THE INVENTION

An ultrafiltration polyimide membrane has been produced using a casting solution made up of polyimide polymers in a dissolving solvent additionally containing a pore forming agent.

The polyimide polymer used is any fully imidized polyimide polymer soluble in a solvent or solvent mixture. Preferably a single solvent is used. The pore forming agent is one which 48%, preferably about 50% more molar volume than the solvent or solvent mixture used, has a solubility parameter (in hildebrands) equal to or greater than that of the solvent and has a polar end and a substantial hydrocarbon character.

The ultrafiltration polyimide membrane has been found to be useful for operation at elevated temperatures and especially for the recovery of dewaxing aid used in solvent dewaxing processes from the wax which is produced.

BACKGROUND INFORMATION

Hydrocarbon oils, derived from paraffinic petroleum basestocks, and even from sources such as tar sands or shale oils, are useful for lubricants and specialty oils and even kerosene and jet fuels only when they have had their wax content reduced. Waxes present in such oils are detrimental to oil or fuel performance since if the oil or fuel is subjected to a low enough temperature environment the wax in the oil or fuel solidifies and forms, at best, a haze and, at worst, a high concentration of solid wax which detrimentally affects the pour point and flowability of the oil or fuel.

To this end, many processes have been developed to reduce the wax content of these hydrocarbon oils. At present, most hydrocarbon dewaxing is practiced utilizing solvent dewaxing processes. These processes are many and varied. Thus, dewaxing can be accomplished by mixing the waxy oil with liquid, normally gaseous autorefrigerative solvents, such as propane, butane, etc., and by reducing the pressure and lowering the temperature sufficiently to precipitate out the wax, which may then be separated from the dewaxed oil. Other dewaxing procedures utilized normally liquid dewaxing solvents, such as ketones (e.g., methyl ethyl ketone and methyl isobutyl ketone) and aromatic hydrocarbon (e.g., toluene) and mixtures of both (e.g., MEK/toluene). In procedures utilizing these solvents the oil is mixed with the solvent and chilled, either directly by using cold dewaxing solvent, or indirectly in indirect heat exchanger means, such as scraped surface chillers, to reduce the temperature and thereby precipitate wax from the oil.

These solvent dewaxing processes, while in themselves operable and efficient, have been improved by use of added dewaxing aids which act as nucleation centers for the wax during wax precipitation and result in production of wax particles which are more readily separable from the oil, i.e., waxes which can be filtered more efficiently from the oil as evidenced by improvements in feed filter rate and liquids/solids ratio of the dewaxed oil.

These dewaxing aids are high molecular weight polymeric materials and include chlorinated paraffins and naphthalene condensation products, polyalkyl acrylate and methacrylates, alkylfurmarates-vinylacetate copolymers, polyethylene oxides, polyvinyl pyrrolidiones, polyisobutylenes, alkali metal stearates, etc. These polymeric materials are of high molecular weight, ranging from 1,000 to 5,000,000, typically 2,000 to 1,000,000, more typically 5,000 to 500,000. They are used in amounts of from 0.01 to 5 weight percent active ingredient based on waxy oil, typically 0.01 to 2 weight percent, most typically 0.1 to 1.0 weight percent active ingredient based on waxy oil feed.

In general, these dewaxing aids are costly chemicals and, to the despair of refineries, have in the past been left in the wax or oil. Typical procedures for recovery of one material from another, such as distillation, have not usually been desirable or successful since the temperature employed in such distillation degrade the polymers, rendering the recovered material of rather limited usefulness. Vacuum distillation is more attractive and has been employed and is covered by U.S. Pat. No. 4,192,732. The disadvantage of even this successful process, however, resides in the fact that it employs distillation, which necessitates the expenditure of energy to heat the oil or wax to effect the separation of the dewaxing aid from said oil and/or wax and requires vacuum equipment.

It would be preferred if a non-degenerative process could be employed which is not energy intensive, which produces a stream of recovered dewaxing aid which has retained its potency and can be recycled for re-use to the solvent dewaxing process.

The use of membrane processes to separate oil and/or wax from dewaxing aid by permeation of the oil and/or wax molecules through a permeable selective membrane has been described in U.S. Ser. No. 588,236 (see EP No. 84308369.2) and U.S. Ser. No. 666,385 (see EP No. 84308368.4). These applications indicate that dewaxing aid can be recovered by permeation of oil/wax molecules through permselective membranes under ultrafiltration conditions and the recovered dewaxing aid retains its potency and can be recycled to the dewaxing process.

However, despite these showings of operability, it would be extremely desirable if the process could be made more efficient, if it could be run at higher temperature and/or higher pressure so as to achieve higher productivity, as well as securing a higher purity recovered dewaxing aid retentate.

To this end a new polymeric material has been identified and suitable membrane prepared which permits operation of the membrane separation ultrafiltration process at higher temperatures to achieve higher productivity.

THE PRESENT INVENTION

It has been discovered that polyimide ultrafiltration membranes made using a casting solution containing a fully imidized polyimide polymer, dissolved in a pro solvent or pro solvent mixture and further containing a pore former characterized as having 43%, preferably about 50% more molar volume than the solvent or solvent mixture used, a solubility parameter (in hildebrands) equal to or greater than that of the solvent and which has a polar end and substantial hydrocarbon character can be employed to separate wax and/or oil from dewaxing aid to yield a retentate stream containing an increased concentration of dewaxing aid (and conversely a reduced concentration of wax and/or oil), said recovered dewaxing aid being a high potency material which can be recycled to the dewaxing process. The separation process itself can be run at higher temperatures and/or pressures than employed in the previously described membrane processes to achieve significantly higher productivity. The polyimide ultra-filtration membrane used in the process is prepared by a technique employing a single solvent or mixed solvent casting solution.

Polyimide that can be converted into the membrane form with the appropriate pore size would include those commercially available from Dow (Upjohn) as 2080 and from Ciba Geigy as XU-218. Other polyimides described in the literature including U.S. Pat. Nos. 4,240,914, 4,378,324 and 3,925,211 are also suitable.

Asymmetric polyimide ultrafiltration membranes are the subject of numerous articles and patents. References to such polyimide ultrafiltration membranes and to methods for their preparation may be found in U.S. Pat. Nos. 4,240,914, 4,378,324, GB Patent No. 2,073,654, GB Patent No. 2,051,664, "New Polyimide Ultrafiltration Membranes for Organic Use", Iwama, et al., *Journal of Membrane Science*, II (1982) 279–309, European application No. 81301480.0 (Publication No 037730), U.S. Pat. No. 3,925,211.

In the present invention the preferred polyimide is the fully imidized polyimide copolymer available from Ciba Geigy and known as XU-218. (also known as Matrimide 5218). This polyimide is based on 5(6)-amino-1-(4,-aminophenyl)-1,3,3,-trimethylindane.

In producing the ultrafiltration membrane the polyimide polymer, preferably XU-218, is dissolved in a pro solvent or mixture of pro solvent. Such pro solvents are methylene chloride, ethylene chloride, chloroform, tetrachloroethane, tetrohydrofuran, dioxane, acetophenone, cyclohexanone, m-cresol, dimethylformamide, N-methylpyrrolidone (NMP) dimethylacetamide (DMAC). As stated the polyimide is dissolved in a single pro solvent or mixture of pro solvents. The preferred solvent is dimethyl formamide.

From 14 to 22 wt % polyimide is dissolved in the solvent or solvent mixture, preferably 15–20 wt % most preferably 16–18 wt %.

It has been found that the use of a pore former is necessary to produce a membrane having a satisfactorily high flux.

Satisfactory pore formers are those which have about 50% more molar volume than the solvent or solvent mixture used, have 43%, preferably a solubility parameter (in hildebrands) equal to or greater than that of the solvent, preferably greater than that of the solvent or solvent mixture, and has a polar end and substantial hydrocarbon character. The casting solution contains from about 6 to 20 wt % pore former, preferably 9 to 13 wt % pore former.

The casting solution is cast onto a suitable support, such as a glass plate, metal plate, moving woven or non-woven fabric backing depending on the particular application to which the membrane will be put. Using the membrane in high temperature ultra-filtration processes will, of course, necessitate the use of temperature resistant backing or support.

A suitable backing material is felt made of Nomex fibers.

The film of casting solution is quenched in an appropriate quenching solvent such as water, to displace the original dissolving solvent used to produce the casting solution. A generally satisfactory and preferred quenching solvent is water. Quenching can take place immediately after film deposition. There is no need for any solvent evaporation.

Prior to use the membrane is washed to remove the quenching solvent (e.g. water), such washing employing solvents such as alcohols (e.g. isopropanol, ethanol, etc.) or ketones (e.g. acetone, MEK), followed by a hydrocarbon solvent (such as heptane, hexane, octane, etc.)

When using the polyimide membrane for the recovery of dewaxing aid from wax and/or oil, the mixture of oil-DWA and/or wax-DWA coming from the dewaxing operation is heated so as to be in the liquid state. For the wax-DWA system, this heating should be up to the temperature at which the hardest wax in the mixture melts and can typically be as high as 275–325° F. but more realistically heating up to 200–225° F. is sufficient.

In the case of the polyimide ultrafiltration membrane made using Ciba Geigy XU-218, because of the nature of the polyimide polymer and its solubility in ketones such as methylethylketone, the membrane is most applicable to the recovery of dewaxing aid from wax produced using liquified, normally gaseous auto refrigerative solvents such as propane, butane, propylene, butylene and mixtures thereof. In such system the membrane is not exposed to the possibility of coming into contact with the MEK and, therefore, does not experience deterioration.

The liquified mixture of oil-DWA and/or wax-DWA is contacted with the thin, dense side of the polyimide ultrafiltration membrane at a temperature of about 70° C. to 250° C., preferably about 100° C. to 200° C., at elevated pressure, typically an applied pressure of about 5–200 psi, preferably about 10–100 psi.

The polyimide membrane when used for the recovery of dewaxing aid is employed in the form of a spiral wound permeator. The polyimide membrane is cast on a backing of NOMEX a temperature resistant support backing. The spiral wound element employs wide channel polyester tricot Dacron polyester with epoxy stiffener as the permeate spacer material and PE 25 polyester (a polyester material having 25 strands per inch in the weave, manufactured by Tetco, Inc. Elmsford, N.Y.) as the feed-retentate spacer material. This material is woven from a polyester monofilament thread of 350 micron diameter. It has a fabric thickness of 780 microns with 44.75% open area. Polyurethane type adhesives such as Fuller UR 2166 is used to produce the bonds needed in element fabrication. Element overwrap is accomplished using an epoxy adhesive such as Fuller FP 1250.

The following examples serve to further illustrate the present invention:

Preparation of Membrane

Two membrane casting solutions were prepared. Both contained Ciba Geigy XU-218 (16 wt %) in DMF but one additionally contained a poreformer satisfying the previously recited criterion. Epsilon Caprolactam was used as the poreformer (11.1 wt %) Caprolactam has a molar volume of 110.9 versus 77.4 for DMF (a pore forming agent molar volume 43.28% greater than that of the solvent) a solubility factor of 12.7 versus 12.1 for DMF and has a ring structure containing 5 $CH_2$ groups connected by an amide linkage.

Membranes were cast using one or the other of the casting solutions on various backing materials selected from polyester, dacron a Nomex. The membrane one backing was about 8 mils thick, of which about 4.5 mils is membrane, the balance being backing.

Table 1 presents the details of 3 membranes produced and evaluated for clean water flux at 75° F. 30 psi.

TABLE 1

| ULTRAFILTRATION POLYIMIDE MEMBRANES | |
|---|---|
| Membrane 1 (Formulation 1) | |
| Polyimide Polymer(1) | 16 wt % |
| DMF | 84 wt % |
| Polyester Backing | |
| "A" Value(2) | 325 |
| Membrane 2 (Formulation 2) | |
| Polyimide Polymer | 16.0 wt % |
| DMF | 72.9 wt % |
| Caprolactam | 11.1 wt % |
| Dacron Backing | |
| 'A' Value(2) | 800–825 |
| Membrane 3 (Formulation 2) | |
| Nomex Backing | |
| 'A' Value(2) | 1288 |

(1)Ciba Geigy XU-218
(2)Membrane clean water flux measured at 75° F., 30 psi
$A = 1 \times 10^{-5}$ gm/cm$^2$ sec. atm.

Table 2 presents the result of using Membrane 3 to recover dewaxing aid from wax.

TABLE 2

| RECOVERY OF DEWAXING AID | |
|---|---|
| | Membrane 3 |
| Flux at 150° C., 1/m$^2$ · d | 227(1) |
| Rejection, % | 100 |

(1)Bright Stock Slack Wax + 0.9% dewaxing aid after 1 hour

In the recovery of dewaxing aid from wax, the dewaxing aid was 50/50 mixture of polyalkylmethacrylate (Rohm & Haas acryloid 150) and an alkyl fumarate vinyl acetate copolymer. Recovery was performed at about 30 psi. Prior to being used in the service Membrane 3 was pretreated by raising the membrane to the 150° C. operating temperature for a maximum of 1 hour.

What is claimed is:

1. A method for producing a polyimide ultrafiltration membrane comprising the steps of dissolving a fully imidized polyimide polymer in a pro solvent and adding a pore forming agent characterized by having 43% more molar volume than the solvent used, a solubility parameter equal to or greater than that of the solvent and a polar end and substantial hydrocarbon character, to produce a casting solution, using said casting solution to produce a thin layer of said polyimide polymer/solvent/pore former, and quenching the layers in a quenching solvent.

2. The method of claim 1 wherein the polyimide polymer is based on 5(6)-amino-1-(4'-aminophenyl)-1,3,3-trimethylindane.

3. The method of claim 1 or 2 wherein the casting solution comprises 14–22 wt % polymer, about 6 to 20 wt % pore former and the balance is the solvent.

4. The method of claim 1 or 2 wherein the solvent used is selected from methylene chloride, ethylene chloride, chloroform, tetrachloroethane, acetophenone, cyclohexanone, m-cresol, dimethylformamide, N-methylpyrrolidone (NMP), or dimethylacetamide (DMAC) and mixtures thereof.

5. The method of claim 1 or 2 wherein the solvent is dimethylformamide.

6. The method of claim 5 wherein the pore former is epsilon caprolactam.

7. The method of claim 1 wherein the pore former is characterized by having at least about 50% more molar volume than the solvent used.

* * * * *